United States Patent [19]
Hyde et al.

[11] Patent Number: 5,751,514
[45] Date of Patent: May 12, 1998

[54] INTELLIGENT DISK DRIVE HAVING SPRING CONTACTS ON A BOARD ASSEMBLY FOR CONNECTING TO EXTERIOR-FACING ELECTRICAL CONTACTS COUPLED TO A SPINDLE MOTOR

[75] Inventors: Darryl L. Hyde, San Jose; John R. Edwards, Mountain View, both of Calif.

[73] Assignee: Western Digital Corporation, Irvine, Calif.

[21] Appl. No.: 671,901

[22] Filed: Jun. 28, 1996

Related U.S. Application Data

[63] Continuation-in-part of Ser. No. 119,023, Sep. 9, 1993, abandoned.

[51] Int. Cl.$^6$ .................................................. G11B 5/012
[52] U.S. Cl. ................................................... 360/97.01
[58] Field of Search .......................... 360/97.01, 98.01, 360/98.07, 99.04, 99.08; 310/67 R, 90; 439/59–62, 81–82; 361/736, 748–9, 784–789

[56] References Cited

U.S. PATENT DOCUMENTS

| | | | |
|---|---|---|---|
| 4,502,747 | 3/1985 | Bright et al. | 339/75 |
| 4,712,146 | 12/1987 | Moon et al. | 360/97 |
| 4,941,830 | 7/1990 | Tkazyik et al. | 439/59 |
| 4,965,684 | 10/1990 | Stefansky | 360/78.12 |
| 4,970,624 | 11/1990 | Arneson et al. | 361/398 |
| 5,025,335 | 6/1991 | Stefansky | 360/97.01 |
| 5,064,377 | 11/1991 | Wood | 439/67 |
| 5,186,634 | 2/1993 | Thompson | 439/82 |
| 5,243,495 | 9/1993 | Read et al. | 361/685 |
| 5,329,412 | 7/1994 | Stefansky | 360/97.01 |

*Primary Examiner*—Robert S. Tupper
*Assistant Examiner*—Brian E. Miller
*Attorney, Agent, or Firm*—Leo J. Young; Milad G. Shara; W. Chris Kim

[57] ABSTRACT

An intelligent hard disk drive, which includes a head disk assembly (HDA) and a printed circuit board assembly (PCBA), has a thin configuration. The HDA includes a spindle motor and the PCBA includes spindle motor driver circuitry. Spring loaded contacts and exposed electrical contacts provide automatic electrical connection between the spindle motor and the spindle motor driver circuitry.

5 Claims, 10 Drawing Sheets

INTELLIGENT DISK DRIVE HAVING SPRING CONTACTS ON A BOARD ASSEMBLY FOR CONNECTING TO EXTERIOR-FACING ELECTRICAL CONTACTS COUPLED TO A SPINDLE MOTOR

CROSS REFERENCE TO RELATED APPLICATION

This application is a 37 C.F.R. §1.53 continuation-in-part of application Ser. No. 08/119,023, filed Sep. 9, 1993, now abandoned the disclosure of which is hereby incorporated by reference.

BACKGROUND OF THE INVENTION

1. Field of the Invention

In general, this invention relates to small form factor, intelligent hard disk drives; i.e., a type of drive that includes a head disk assembly ("HDA") and a printed circuit board assembly ("PCBA") that is attached to the HDA and that includes intelligent drive controller electronics. More particularly, it relates to such a drive having structure that facilitates providing a thin, low-cost drive with an advantageous arrangement for electrically connecting a spindle motor of the HDA to motor driver circuitry on the PCBA.

2. Description of the Prior Art and Related Information

Many problems in the art of intelligent hard disk drives relate to the need to reduce manufacturing costs to meet market demands. In this market, customers demand low-cost drives that meet exacting specifications in capacity, performance, and compact size. Drive manufacturers compete vigorously in this market by, among other things, conducting extensive research and development directed to developing low-cost components, assemblies, and assembly processes for high-volume manufacture of such drives.

Particular such problems concern manufacturing operations during which the HDA and the PCBA are assembled together. The HDA defines a substantially sealed interior and has an exterior that is generally a rectangular parallelepiped in shape. The HDA includes at least one disk within its interior. The housing is substantially sealed to prevent contaminants from entering the interior of the housing where they could interfere with operations involving writing to and reading from the disk. The HDA also includes a spindle motor for rotating each disk. The spindle motor has electrically energizable windings to receive driving current to cause the motor to rotate. The PCBA includes drive controller electronics for various drive subsystems for controlling various functions including servo, read and write, and spindle motor speed control. The drive controller electronics includes spindle motor driver circuitry. In mechanically and electrically connecting the PCBA to the HDA, the windings of the spindle motor must be electrically connected to the spindle-motor driver circuitry.

These particular problems are especially severe in the context of low-height, small form-factor drives. Here, "low height" refers to the shortest of the three dimensions of the rectangular parallelepiped defined by the drive. That is, a drive has a length, a width, and a height. By custom, the length and width dimensions are often expressed in inches, and the height dimension is often expressed in millimeters. For example, a drive having a form factor that is commonly referred to as a 1.8" drive is 3" long, 1.8" wide, and is suitably 9.5 mm high.

Meeting the size specifications customers demand poses significant design challenges for laying out the major mechanical and a few of the electrical components of the drive into the housing of the HDA, and the major controller electronics into the PCBA. As disk drive form factors shrink to accommodate portable computers and other space-limited applications, it becomes increasingly difficult to assemble the HDA and the PCBA as a suitably thin product. A particular problem relates to the electrical connection between the spindle motor and the driver circuitry therefor.

Electrically, this connection is typically achieved by a number of interconnected components that extend in a roundabout path defined inside the HDA from the spindle motor to a prefabricated connector sometimes referred to as a "header." An example of this typical prior art arrangement is shown in U.S. Pat. No. 4,965,684 (the '684 patent) which refers in column 6, at line 7 et seq., to a "header" that carries all of the electrical signals from the PCBA to the controlled environment within the HDA. The '684 patent shows in its FIG. 4 a flex circuit extending the full length of the distance between the spindle motor and the header. The prior art approach of using such a header and long flex circuit within the interior of the HDA adds cost and complexity, and can increase the overall height of the drive because of the vertical stack-up of dimensions from the HDA base, a connector module body mounted on the exterior of the base, and the mated connection between the PCBA and base.

Accordingly, a need presently exists for a drive which avoids the above-noted problems.

SUMMARY OF THE INVENTION

This invention can be regarded as an intelligent disk drive comprising a HDA and a PCBA. The HDA defines a substantially sealed interior and having an exterior. The HDA includes a base having a motor mounting hole. The HDA also includes a spindle motor and a magnetic disk. The spindle motor has a generally cylindrical portion and a generally planar surface, with the generally cylindrical portion extending axially and terminating at the generally planar surface to define a step. The spindle motor is mounted to the base such that an axially extending portion of the generally cylindrical portion is surrounded by the hole in the base, the generally planar portion defines a circular portion of the exterior surface of the HDA. The magnetic disk is mounted to be rotated by the spindle motor. Significantly, the HDA further includes conductive lead means having a first, second and third strip portions. The first strip portion is at one end of the conductive lead means and lies flat against the generally planar surface of the spindle motor. The second strip portion lies against the step. The third strip portion has a plurality of exterior-facing electrical contacts and lies in a plane parallel to the first strip portion.

The PCBA includes a printed circuit board and control circuitry for the spindle motor. The board has a planar surface and an opening. The control circuitry is attached to the board. The PCBA is mounted to the HDA such that the opening is aligned with the exterior-facing electrical contacts, and such that the planar surface of the board faces away from the exterior-facing electrical contacts.

Significantly, the PCBA includes a plurality of spring contacts for electrically connecting the exterior-facing electrical contacts to the control circuitry. Each spring contact has a tab portion inserted into the planar surface of the board, and a spring portion extending from the tab portion through the opening to effect spring-biased electrical contact with a respective one of the plurality of exterior-facing electrical contacts.

Preferably, the conductive lead means is implemented by a flexible printed circuit cable or so-called "flex circuit."

Preferably, the flex circuit includes a fourth strip portion, remote from the first strip portion, and the base includes means engaging the fourth strip portion to prevent the flex circuit from dangling.

An advantage of the claimed invention is that it facilitates making a thin drive. Another advantage is that the structure is fully repairable and easily manufacturable. In particular, this claimed invention allows the spindle motor control circuitry on the printed circuit board to automatically electrically engage with the spindle motor leads during assembly of the PCBA to the HDA. BRIEF DESCRIPTION OF THE DRAWINGS

FIGS. 3a–3e are top, bottom, and side, and exploded views, respectively, of the motor/base assembly of the drive of FIG. 1

DETAILED DESCRIPTION OF THE INVENTION

Figure 1A:
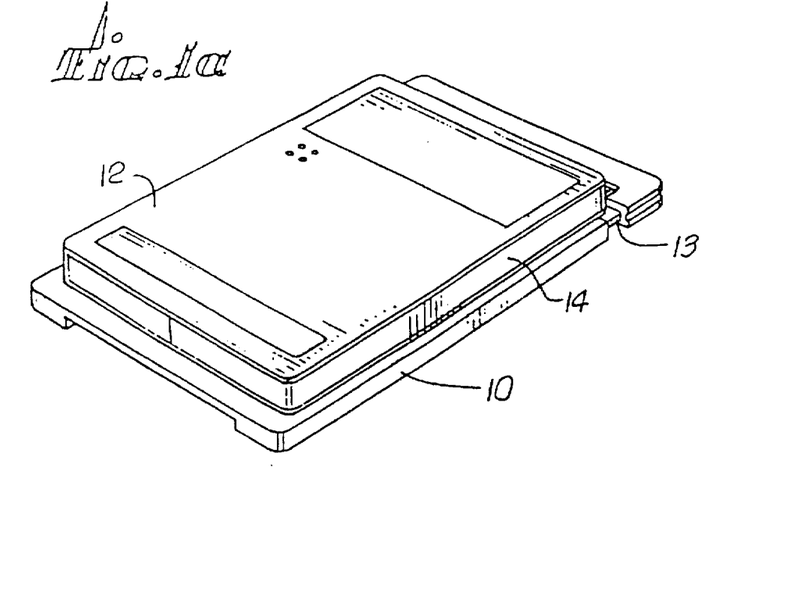
FIG. 1a and FIG. 1b are perspective and cut-away views, respectively, of an intelligent disk drive in accordance with a preferred embodiment of the present invention.

An intelligent disk drive as shown in Fig. 1a comprises a head disk assembly ("HDA") that includes a base 10 and a cover 12. The drive further includes a printed circuit board assembly ("PCBA") 13. The HDA defines a substantially sealed interior and has an exterior. Suitably, the HDA includes a tape seal 14 for cooperating with base 10 and cover 12 to define the substantially sealed interior and thereby provide a controlled, substantially particle free environment therein.

The HDA includes within its interior a magnetic disk 18 (FIGS. 1b, 2a) and the other major mechanical and electromechanical components of the drive. Alternative embodiments may include more than one disk. Suitably, base 10 and cover 12 match in rectangular shape and fit. Suitably, base 10 includes a set hollow of posts 16 (FIGS. 1b, 2a) and cover 12 includes a set of openings 17 having recessed pegs (FIG. 2c). To assemble cover 12 to base 10, posts 16 are inserted into openings 17. Although three engaging post/engaging opening pairs are illustrated, a greater or lesser number may be employed. Also, other engaging mechanisms may be employed, such as matching ridges and grooves, overlapping edges dimensioned to snap fit, etc. Suitable overall dimensions of the assembled intelligent drive (including HDA and PCBA) are approximately 9.5 mm high by 3.0 inches long and 1.8 inches wide. This invention may be embodied in intelligent disk drives having other form factors.

Suitably, base 10 has a hybrid construction; i.e., base 10 includes two different portions made of different materials. More particularly, base 10 includes a rigid base plate 15 (FIGS. 1b, 2d) made of, for example, steel, and a base member 11 (FIGS. 2a, 2d) made of a light weight, readily molded material, such as plastic. Rigid base plate 15 is adapted to receive the major electromechanical components of the HDA while base member 11 is readily molded to be adapted to engage cover 12. Cover 12 is suitably made entirely of plastic.

The principal HDA mechanical and electromechanical subassemblies are mounted to base 10, on rigid base plate portion 15 thereof, in a very compact layout. The principal subassemblies of the HDA are: a disk stack assembly 22 (FIG. 2a); a spindle motor 24 (FIGS. 2a, 3a–3d); an actuator assembly 26 (Fig. 1b); and a voice coil magnet assembly 28 (FIG. 2a). These subassemblies of the HDA are maintained in a precise relationship by precisely machined mounting positions on base 10.

Figure 2A:
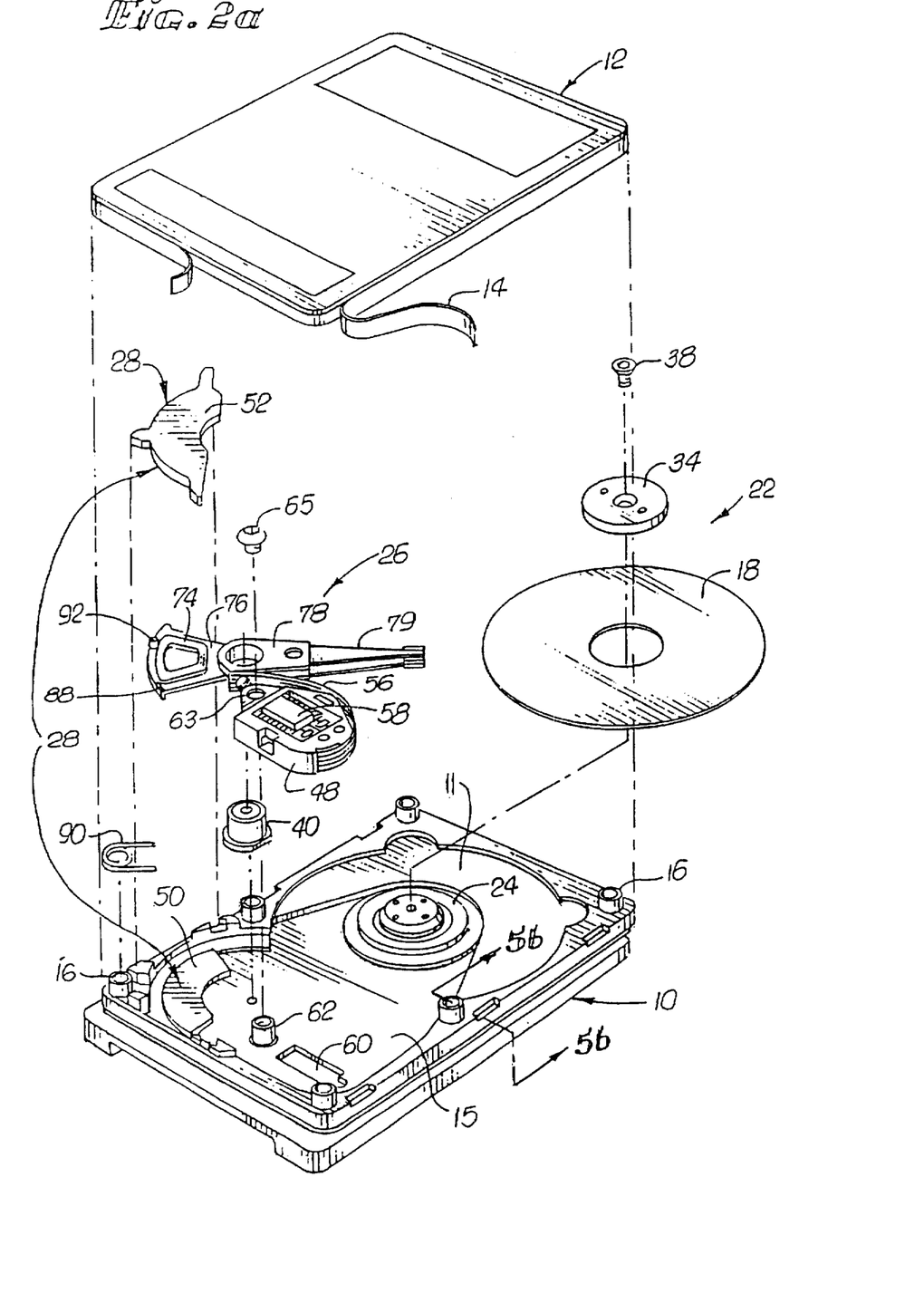
FIGS. 2a–2d are an exploded view, side view, perspective view of the cover bottom, and a partial exploded view, respectively, all showing the drive of FIG. 1.
Figure 2B:
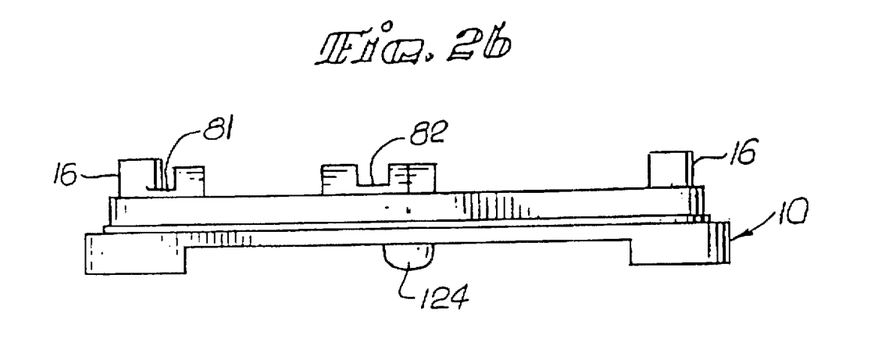
Figure 3A:
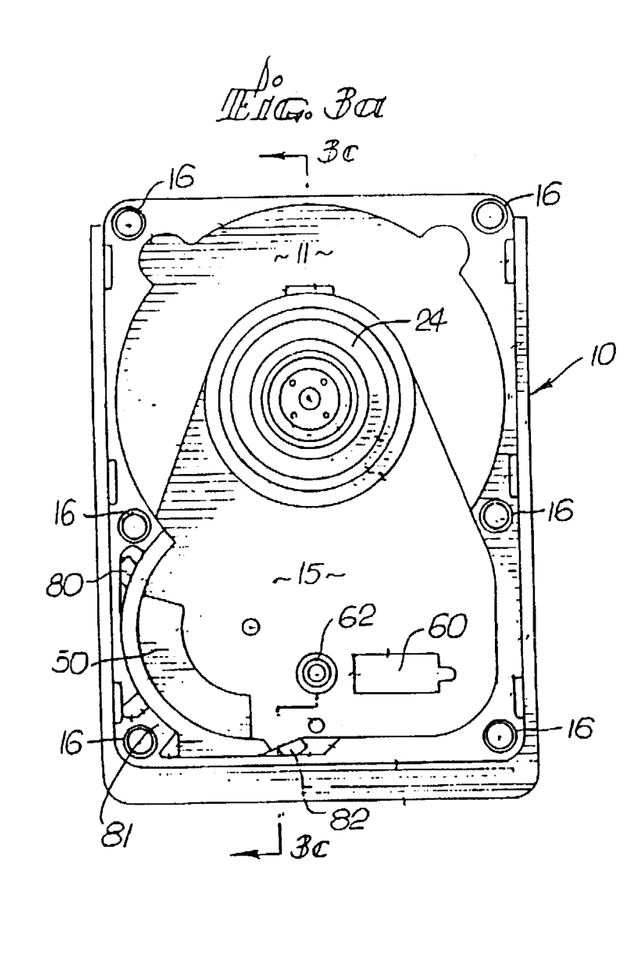
Figure 3B:
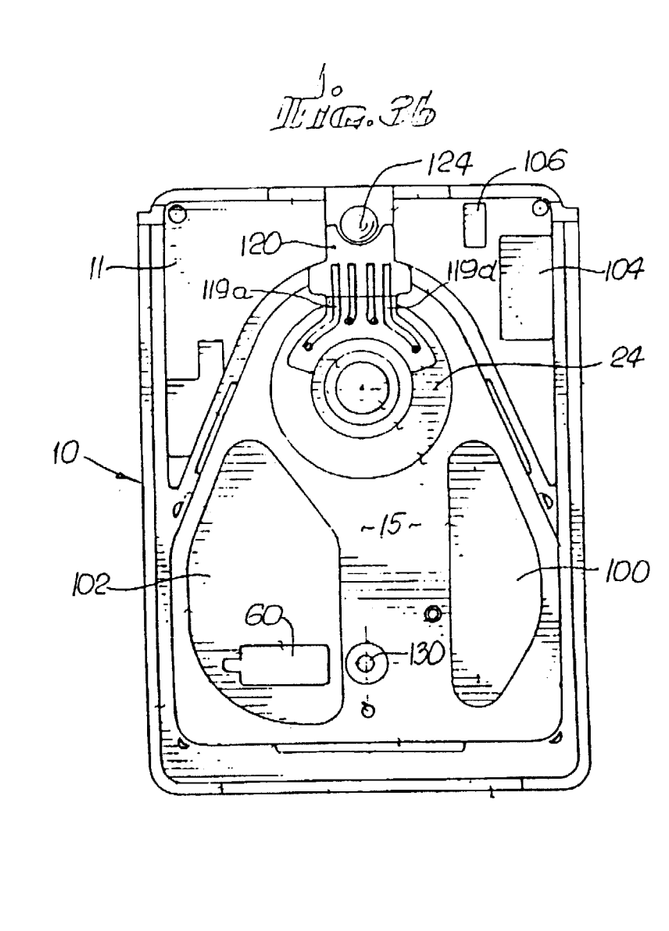
Figure 3C:
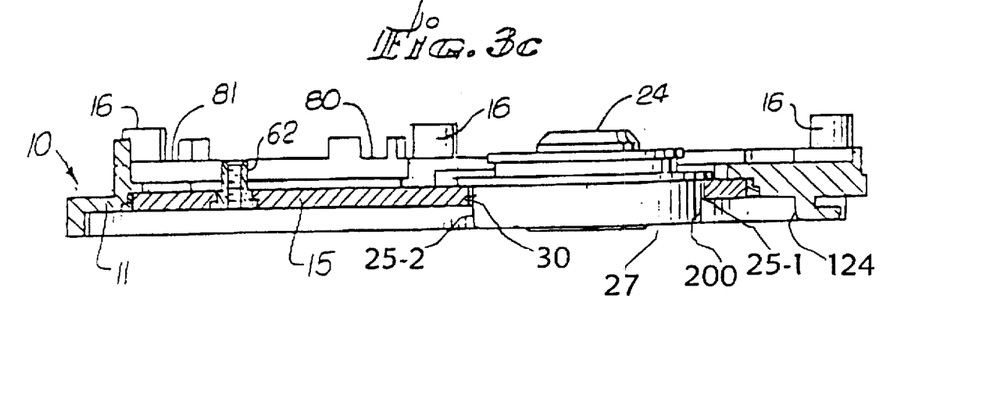
Figure 3D:
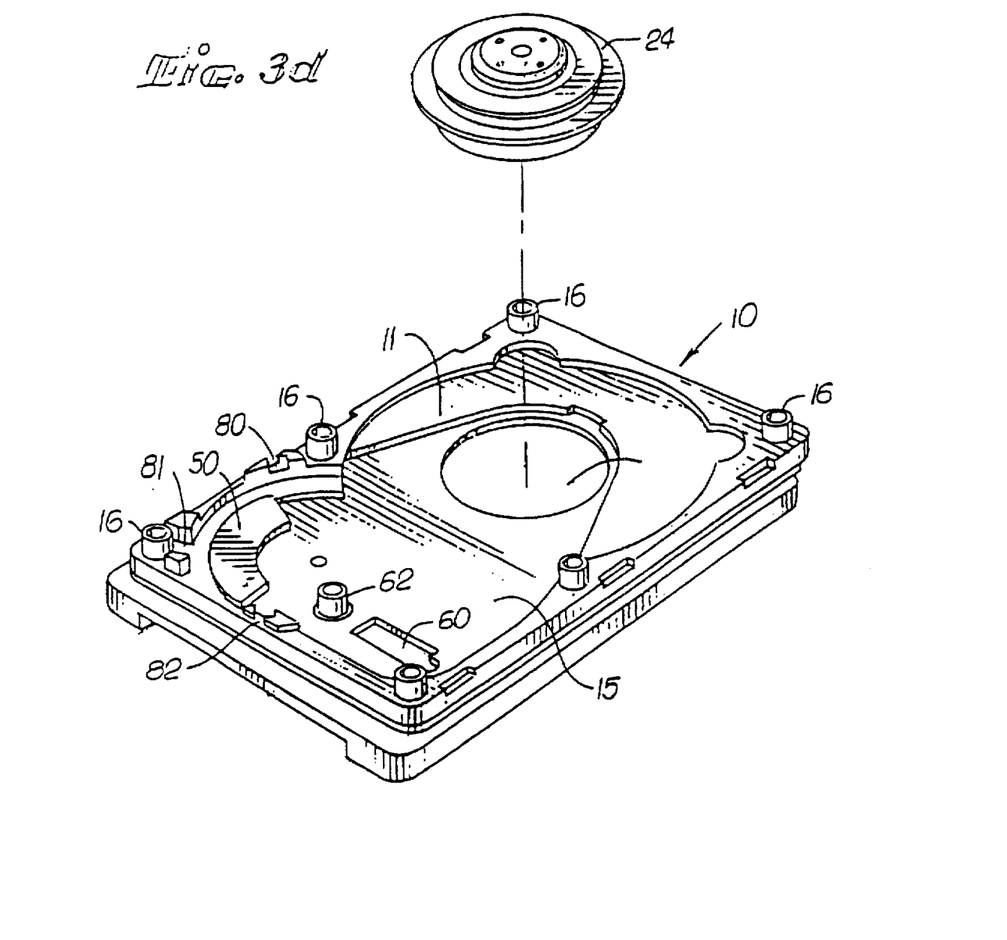
Figure 4A:
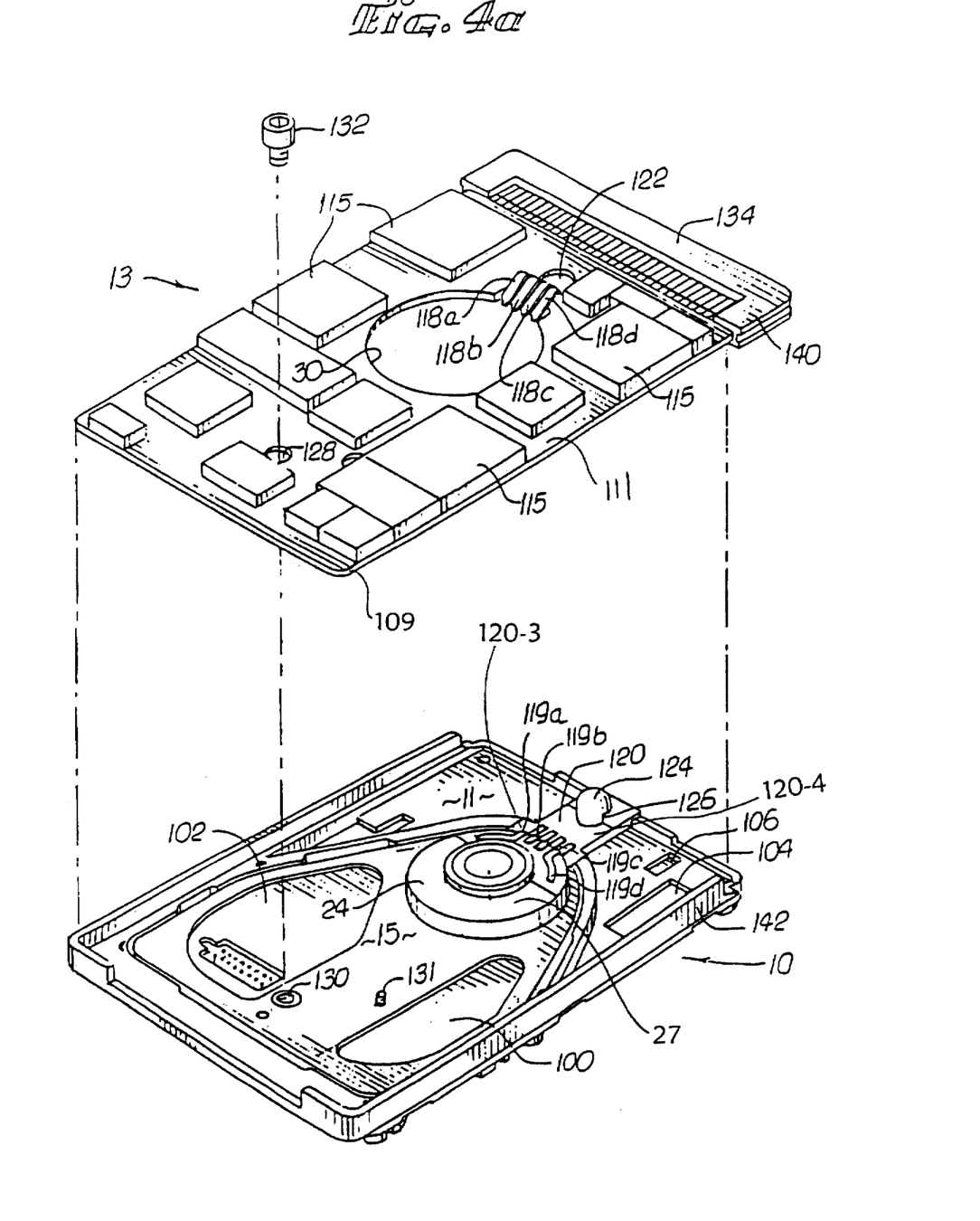
FIG. 4a is a bottom exploded view of the base/circuit board assembly of the drive of FIG. 1.

More specifically, spindle motor 24 is securely mounted to base 10 to form a base/motor assembly as shown in FIGS. 3a–3d. Spindle motor 24 has a generally cylindrical portion 25 (FIG. 3d) and a generally planar surface 27 (FIGS. 3c and 4a). As shown in FIG. 3c, generally cylindrical portion 25 extends axially and includes an axially extending portion 25-1 and an axially extending portion 25-2. Generally cylindrical portion 25 terminates at generally planar surface 27 to define a step 200. Base 10 includes a circular spindle motor mounting opening or hole 30 (FIGS. 3c and 3d). Spindle motor 24 is mounted to base 10 such that axially extending portion 25-1 of generally cylindrical portion 25 is surrounded by hole 30, and such that generally planar portion 27 defines a circular portion of the exterior surface of the HDA. As also shown in FIG. 3c, axially extending portion 25-2 of generally cylindrical portion 25 extends below the bottom surface of base 10. Spindle motor 24 is mounted securely to base 10, for example through mounting holes and matching bolts (not shown). Alternatively, spindle motor 24 may be adhesively bonded to base 10. Disk stack assembly 22 is in turn mounted to spindle motor 24 through a disk clamp 34 through a single mounting screw 38, as shown in FIG. 2a.

Spindle motor 24 preferably is a commercially available brushless three phase motor having the disk mounting hub coupled thereto through a spindle bearing assembly (not shown). Spindle motor 24 rotates the disk or disks at a constant speed. The speed of the spindle motor is preferably monitored by sensing the back EMF from spindle motor 24 to derive the spindle angular position and speed. This information is then used to provide a drive current to the spindle motor 24 to stabilize the angular velocity at the desired R.P.M.

Figure 6:
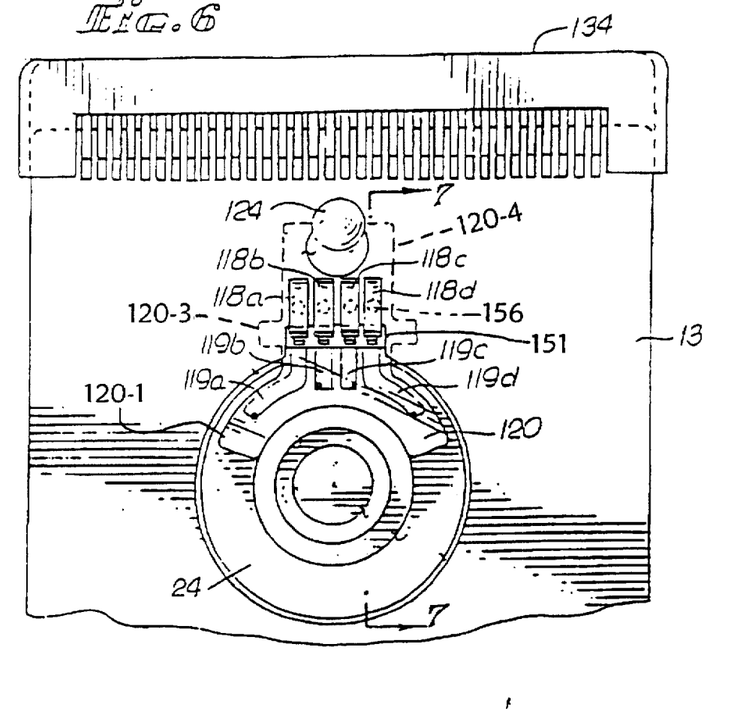
FIG. 6 is a top view of a portion of the circuit board assembly showing the spring contacts used to connect the spindle motor to the circuit board assembly in accordance with this invention.
Figures 7, 8:
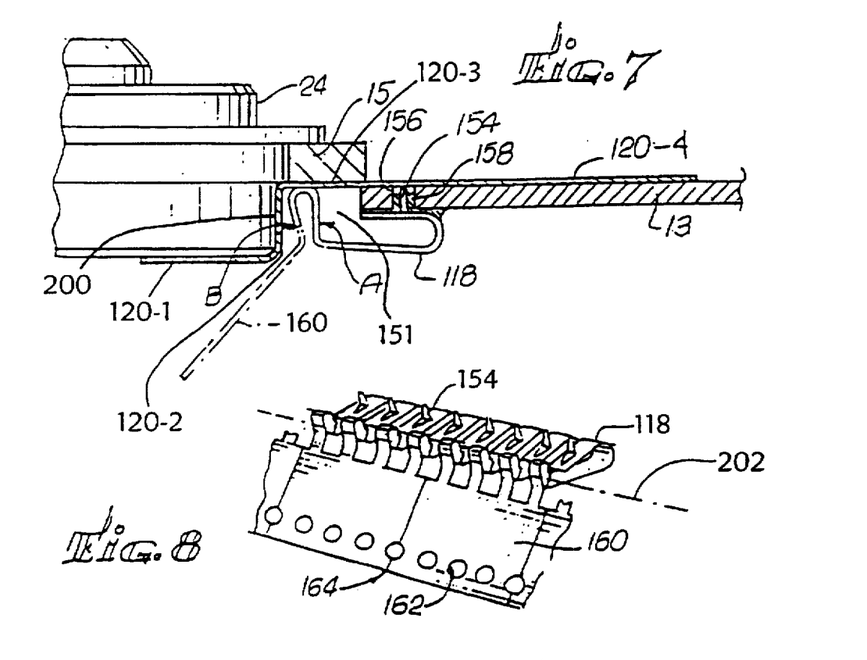
FIG. 7 is a view that shows a cross-section of the circuit board assembly and shows a tab portion of a spring contact embedded in the board of the board assembly.
FIG. 8 is a perspective view of the spindle motor spring contact carrier employed during the manufacturing and assembly process.

Significantly, the HDA includes a conductive lead means preferably implemented by a flexible printed circuit cable or "flex circuit" 120 which is provided on the exterior of the HDA (FIGS. 3b, 4a, 6, and 7). Flex circuit 120 has a plurality of strip portions 120-1 through 120-4 (FIGS. 6 and 7). A first strip portion 120-1 is at one end of flex circuit 120 and lies flat against generally planar surface 27 of spindle motor 24. Second strip portion 120-2 lies against step 200. Third strip portion 120-3 has a plurality of exterior-facing electrical contacts 119a through 119d, and lies in a plane parallel to first strip portion 120-1. Base 10 includes means, preferably implemented by a post 124 engaging fourth strip portion 120-4 to prevent flex circuit 120 from dangling.

Figure 2C:
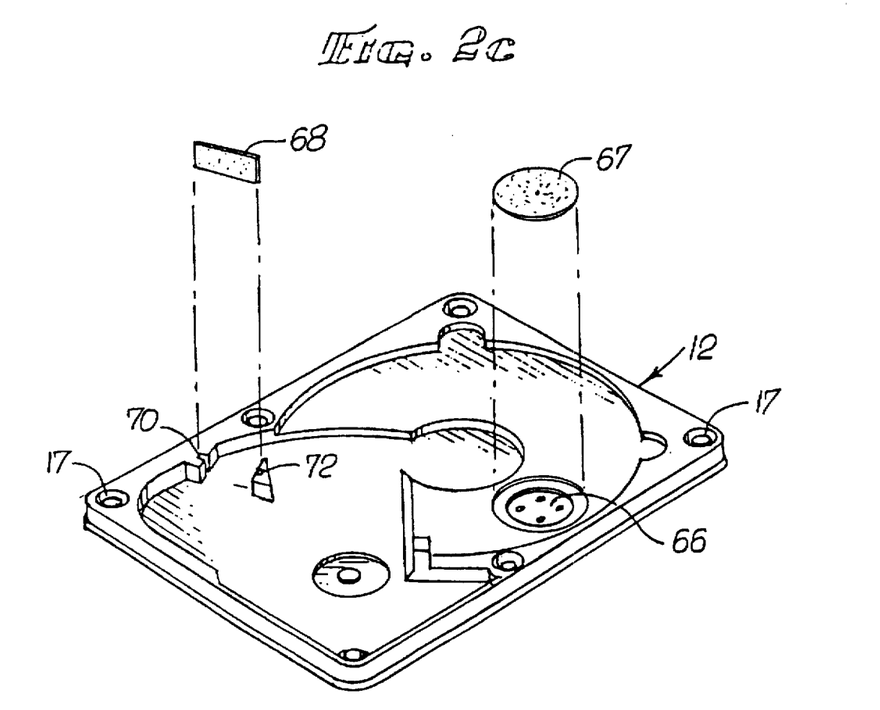
Figure 2D:
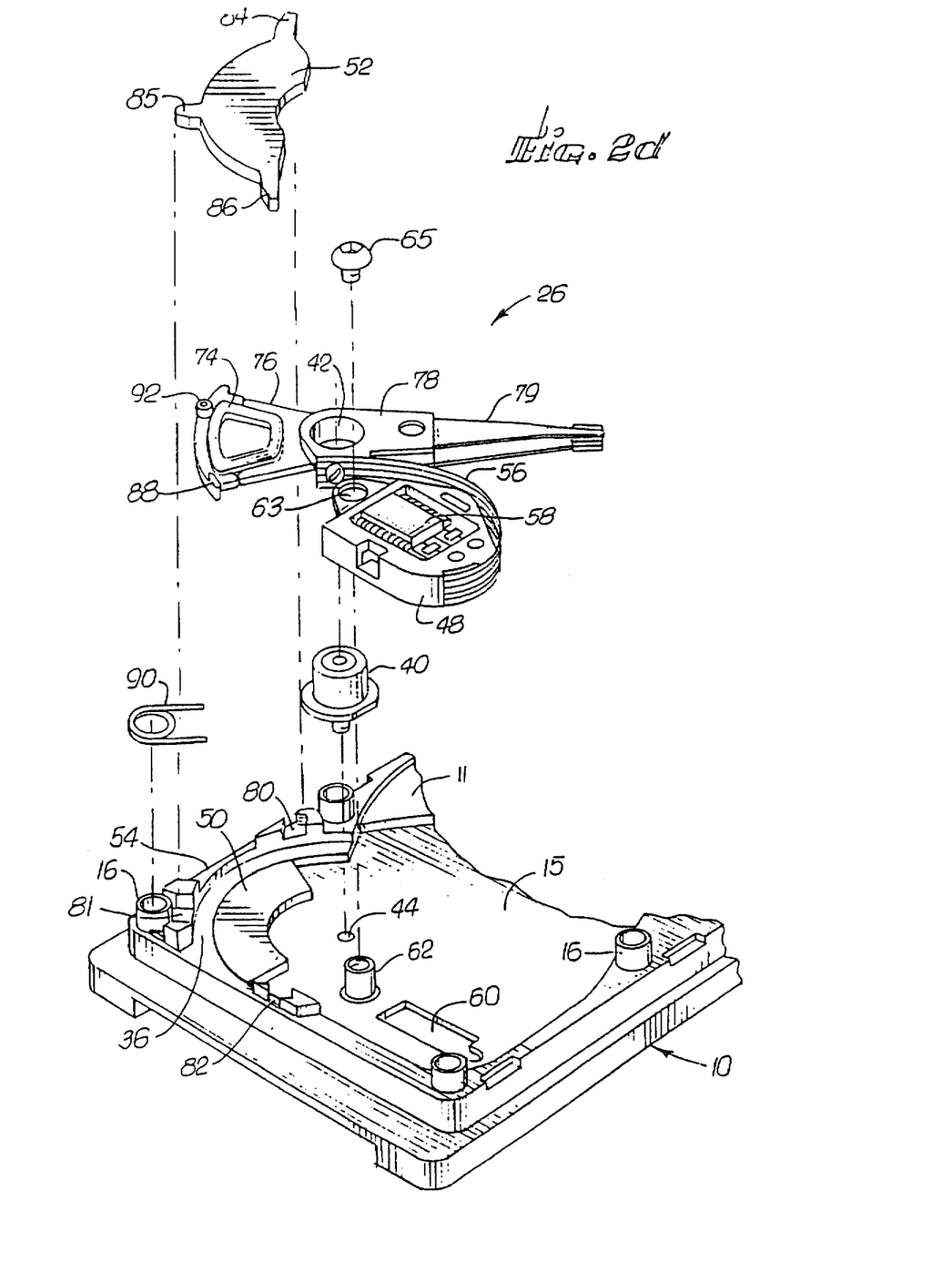

Referring to FIGS. 2a and 2d, actuator assembly 26 is mounted on base 10 through mounting pivot post 40 and a matching cylindrical opening 42 in the actuator. Actuator mounting post 40 is preferably mounted in a machined hole 44 in base 10 which facilitates mechanical alignment of the actuator assembly on base 10 during assembly.

Figure 1B:
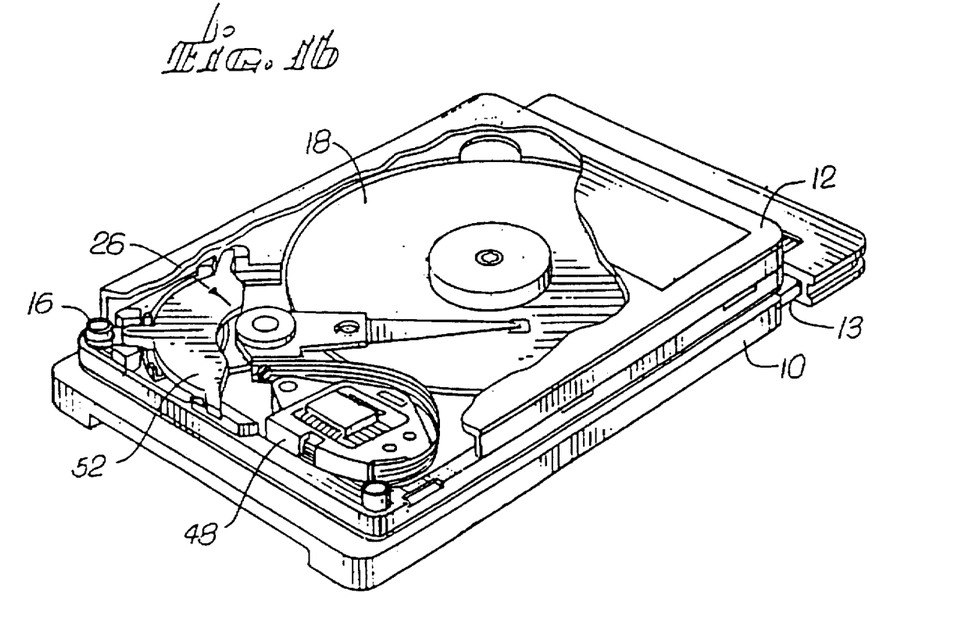

Referring to FIGS. 1b, 2a and 2d, voice coil magnet assembly 28 is mounted onto a portion of base 10 which is of a magnetic material and which forms the bottom magnet plate of the voice coil magnet assembly. Voice coil magnet assembly 28 also includes a permanent magnet 50 adhesively bonded or otherwise securely mounted to base 10 so as to abut against a molded portion 36 which provides for accurate registration of this component during assembly of the drive. The magnet assembly also includes an upper magnet plate 52 which may preferably be firmly held in place against spacer ledge 54 by the magnetic force applied to upper magnet plate 52.

Turning more specifically to each of the subassemblies of the HDA illustrated in FIGS. 1a, 1b and 2a and 2d, disk 18 of the disk stack assembly 22 is a thin rigid platter, preferably made of aluminum coated with a layer of nickel. The nickel coated surfaces of disk 18 are coated with magnetic media and a thin film of protectant overcoat is provided on top of the magnetic media to protect it from wear and abrasion from the read/write heads. Additionally, a lubricant is preferably provided in a thin layer on top of the protectant overcoat to provide further protection between the read/write heads and the media during initial starting and stopping of the drive. At such times the heads contact the surfaces as they are initially caused to fly above the disk surfaces and allowed to land on the disk surfaces, respectively. In this regard, the innermost region of the disk surfaces is preferably employed as a landing zone for the read/write heads; that is, the inner region of the disk surfaces is not employed for data storage and is used as the resting place for the read/write heads when the drive is inactive. Single screw disk clamp 34 rigidly clamps the disk or disks to a rotatable hub and spindle motor 24.

As further illustrated in FIGS. 2a–2d, actuator assembly 26 preferably includes a flex circuit 56 and connector module 48 for electrically connecting the magnetic transducer heads and voice coil to the disk drive controller, servo and read/write control electronics. More specifically, flex circuit 56 connects the read/write transducer heads and the voice coil to connector module 48 through thick film connective leads encased in a flexible plastic carrier. Connector module 48 may include an integrated circuit (IC) 58, preferably a preamp circuit for the read/write channel, to take advantage of the space within the disk drive HDA. The remainder of the integrated circuits and other control electronics are preferably components of PCBA 13. IC/connector module 48 may preferably be mounted over opening 60 in base 10 and is secured through clamp post 62 adjacent opening 60. Clamp post 62 mates with opening 63 in connector module 48 and has a threaded inner opening for receiving screw 65, to securely hold the module in place adjacent the opening 60. Connector module 48 extends below base 10 through opening 60 via a connector socket portion which mates with a matching connector plug on PCBA 13, as discussed below.

As further illustrated in FIGS. 2a and 2c, an air filtration system is provided by means of air access port 66 and breather filter 67 in cover 12, and recirculating air filter 68 which is held in place by filter mounting brackets 70, 72 in cover 12. Recirculating air filter 68 cleans the air within the HDA, and traps any particulates which may be generated during spindle start and stop operations.

Filter 68 is configured adjacent to disk 18 such that the air circulation within the HDA caused by the disk rotation will pump air through filter 68. Breather filter 67 cleans any air entering the HDA and also equalizes pressure within and without the HDA. Preferably, the HDA is assembled in a Class 100 environment and the air filtration system substantially maintains such Class 100 environment. Also, tape seal 14 further ensures such a contaminant free environment within the HDA by virtue of its sealing the entire junction between base 10 and cover 12 so as to minimize the possibility of entry of contaminants through this junction.

Referring to FIG. 2d, actuator assembly 26 includes a voice coil 74 held in place by a triangular-shaped voice coil support member 76. Voice coil support member 76 is suitably formed as an integral piece with actuator "E-block" 78 which supports the flexures or support arms 79, which in turn support the read/write transducer heads. Voice coil 74 is formed of a copper wire coil which is adhesively bonded to voice coil support member 76. Voice coil 74 is supported in the space between upper magnet plate 52 and magnet 50 by support member 76 so as to be freely rotatable through an arcuate range corresponding to the usable surface of disk 18.

The space for voice coil 74 is created by ledge 54, in base 10, which portion thereof may preferably be made of plastic to facilitate ease of molding the ledge. Upper magnet plate 52 is firmly held in place by magnetic force and notches 80, 81 and 82 in ledge 54 and matching arms 84, 85 and 86 in upper magnet plate 52. This thus holds voice coil magnet assembly 28 securely in place in a manner which is readily assembled during manufacture of the disk drive and which may also be disassembled easily in case the disk drive needs repair.

As further illustrated in FIGS. 2a, 2d and 3d, the angular motion of actuator assembly 26 is constrained between first and second angular positions by crash stop 90. At the first angular position, crash stop 90 engages the movable voice coil in actuator assembly 26 through a crash stop tang 88 which is molded to an outer cover edge of the voice coil support 76. At the second angular position, crash stop 90 engages the movable voice coil through a latch pin assembly 92 which is bonded to an outer edge of the voice coil support 76. Both crash stop tang 88 and latch pin assembly 92 are on the same surface of voice coil support 76, and extend upwardly and away from coil 74, defining two opposing parallel surfaces which engage crash stop 90. The latch pin assembly 92 preferably includes a small permanent magnet which is adhesively bonded or otherwise firmly mounted to voice coil 74. Crash stop 90 in turn may be a simple wire loop spring which wraps about post 16 with its arms disposed between the opposing parallel surfaces defined by latch pin assembly 92 and crash stop tang 88. Crash stop 90 provides a crash force absorbing feature in a simple structure, constraining the angular motion of the actuator so as to maintain the magnetic transducer heads on the operational surface region of the magnetic disks.

The readily molded plastic portion of base 10 allows precise engagement with cover 12 through mounting posts 16 and matching engaging holes 17 in cover 12 and also allows molding of a portion of the voice coil assembly 28 into the base. That is, the formation of ledge 54 and slots 80, 81 and 82 adapted to receive upper magnet plate 52 allows integration of the voice coil motor assembly 28 with the base in a very compact configuration which is also easily manufactured. Further, incorporating the lower magnet plate of the actuator assembly 26 as part of the base plate of base 10 further reduces space taken by the voice coil motor portion of actuator assembly 26. Hybrid base 10 combining the use of magnetic rigid material for the base plate and a readily molded plastic or similar material for the remainder of the base allows a very compact and easily assembled structure for the actuator assembly and related components while at the same time providing secure engagement with cover 12.

Figure 4B:
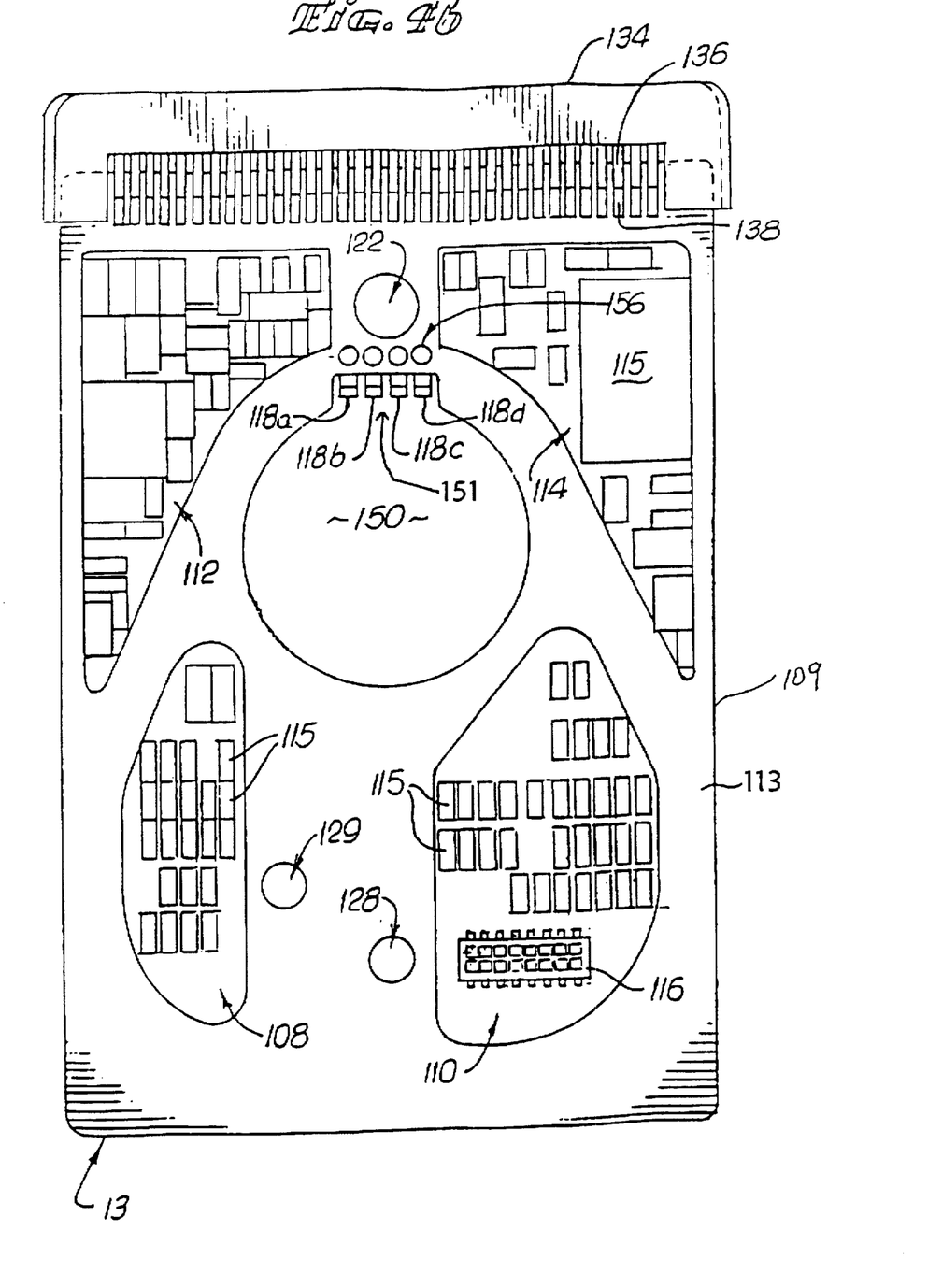
FIG. 4b is a top view of the circuit board assembly of the drive of FIG. 1.

Referring to FIGS. 4a and 4b, PCBA includes a printed circuit board 109 and a number of integrated circuit chips (ICs) 115 illustrated generally by various size rectangles. These ICs provide the disk drive control electronics including the disk drive servo-control, motor control and read/write control electronics.

Board 109 has a planar surface 111 (FIG. 4a) that faces away from the HDA, an opposite planar surface 113 (FIG. 4b), and a generally circular opening 150 to accommodate generally cylindrical portion 25 of spindle motor 24, of dimensions generally matching opening 30 in base 10.

Significantly, PCBA 13 also includes a plurality of spring contacts 118a–d, and board 109 has an opening 151 over which spring contacts 118a–d are cantilevered. Each of spring contacts 118a–118d includes an tab portion 154, and board 109 includes a set of engaging holes such as hole 156 (FIG. 7). Each spring contact 118a–118d has its tab portion 154 individually inserted into a respective one of engaging holes 156 and attached therein as illustrated in FIG. 7 by reflow soldering 158. Each of spring contacts 118a–118d has a spring portion (FIG. 7) that extends from its tab portion 154 through opening 151. Upon assembly of PCBA 13 to the HDA, each of spring contacts 118a–118d has its spring portion effecting spring-biased electrical contact with a respective one of exterior-facing contacts 119a–119d formed on flex circuit 120.

As further shown in FIGS. 4a and 4b, board 109 has a plurality of alignment and mounting holes 122, 128, and 129. To cooperate with these holes in board 109, base 10 has a plurality of alignment and mounting pins 124 and 131, and has a threaded opening 130. Pins 124 and 131 project from the exterior of the HDA toward PCBA 13. As further shown in FIG. 4a, alignment and mounting pin 124 preferably has a notched portion 126. During assembly of PCBA 13 to the HDA, pin 124 is slipped through hole 122 in board 109 and then board 109 is pulled slightly to slip underneath pin 124 into notch 126. When thus aligned and positioned, mounting hole 128 in board 109 is aligned over threaded opening 130 in base 10. Alignment hole 129 (FIG. 4b) and matching alignment pin 131 in base 10 are also aligned thereby providing a three point alignment. A single mounting screw 132 may then be threaded into place, through opening 128 into threaded opening 130, to complete the assembly of PCBA 13 to the bottom of base 10.

During the assembly the spring contacts 118a–d are automatically biased into contact with matching contacts 119a–119d on flex circuit 120 to couple the circuit board electronics to the spindle motor. At the same time, the connector plug 116 on PCBA 13 is automatically engaged with matching socket on connector module 48. The base/circuit board assembly is well suited for automated manufacturing facilities, thereby increasing the efficiency of the assembly process and hence decreasing the overall cost of the disk drive.

In FIG. 6, PCBA is illustrated in a bottom view thereof with the, integrated circuits mounted thereon not shown and with spring contacts 118a–118d shown in engagement with exterior-facing electrical contacts 119a through 119d of flex circuit 120. In FIG. 7, in turn, a representative one of spring contacts 118a–118d is illustrated in a sectional view illustrating its contact with a corresponding one of exterior-facing electrical contacts 119a through 119d of flex circuit 120. The plastic base member 11 is not shown for convenience of illustration.

To allow automated handling of spring contacts 118 while at the same time individually mounting them in holes 156 on board 109, a carrier 160, illustrated in FIG. 8, is preferably employed. Carrier 160 holds a large number of spring contacts 118 on an elongated band of carrier material 160 which has holes 162 therein adapted for automated handling. Carrier 160 is preferably formed of the same material as spring contacts 118 with the bridge-like connections 164 therebetween being scored to allow the carriers to be broken off in groups of four. A second score line is provided to break the carrier off from the spring contacts after they are mounted to the circuit board. This scored break off point is illustrated by the break B in FIG. 7 between the carrier 160 and the spring contacts 118 and by a dashed line 202 in FIG. 8.

A suitable material for the spring contacts and carrier 160 may be a metal with an appropriate spring characteristic; for example a beryllium-copper alloy in a presently preferred embodiment, with a thickness of approximately 0.2 millimeters. To ensure good electrical contact with the spindle motor contacts when the spring contacts are biased thereagainst, a portion of the contacts 118 is preferably coated with a thin layer of gold. For example the gold plated region may extend over the portion of the spring contact 118 extending between points A and B in FIG. 7. Such gold plating, which may for example be as thin as 0.0007 millimeters, is preferably provided over a thin electroplating of nickel, e.g., approximately 0.001–0.004 millimeters thick. An underlying electroplated nickel layer is also preferably provided around the engaging tab 154 with an overlayer of tin-lead (90-10) plating.

Referring to FIG. 7, after spring contact 1 18 is mounted on board 109, and the carrier is broken off a very compact profile is provided for spring contact 118. For example, in a presently preferred embodiment wherein the contact is constrained to not extend below planar surface 27 of spindle motor 24, it will be seen from inspection of FIG. 7 that, with the geometry and the dimension of the spring as shown, such constraints may be readily achieved while providing the good electrical contact with the spindle motor flex circuit 120. The spindle motor flex circuit 120 in turn is held flat against the opposite surface of PCBA 13 through base plate 15 and through engaging tab 124, (as shown in FIG. 6). Spindle flex circuit 120 contact leads 119a–d are also preferably gold plated to filter facilitate good electrical contact with spring contacts 118a–d.

The contact between spring contacts 118a–d and contacts 119a–d is automatically achieved during assembly of the PCBA 13 to base 10. This allows for ready assembly and reassembly of PCBA 13 and the HDA during initial assembly or during repairs or reworking of the drive during manufacturing test and certification procedures.

In order to accommodate the large number of integrated circuits which are typically necessary for a high capacity, high performance intelligent disk drive, both surfaces 111 and 113 of board 109 are suitably employed for supporting integrated circuits 115. This is illustrated by the view of the side of PCBA 13 facing base 10 illustrated in FIG. 4b. Also, to accommodate varying height ICs and to minmize weight of the overall disk drive, portions of the PCBA 13 as well as portions of base 10 have recesses therein in order to accommodate larger ICs and minimize weight. In particular, as shown in FIG. 4a base 10 has recesses 100, 102, 104 and 106, formed in both base plate 15 of base 10 and plastic base member 11.

Similarly, PCBA 13 has component areas 108, 110, 112 and 114 to provide additional space for large ICs, connectors, as well as for other circuit board components such as resistors, and capacitors indicated generally by smaller rectangles 115. Also, recesses 100, 102, 104 and 106 and matching component areas 108, 110, 112 and 114 reduce the overall height of the disk drive assembly.

In particular, area 110 and matching recess 102 in base 10, together provide space for connector plug 116. Connector plug 116 may preferably be a 16 pin J2 connector plug which mates with a matching 16 hole connector socket (or vice versa) in the bottom of connector module 48 through opening 60 in the bottom of base 10 as illustrated in FIG. 4a. This 16 pin connector plug and socket provides the electrical connections between PCBA 13 and the voice coil motor of actuator assembly 26 and the read/write transducer heads via flex circuit 56 and preamp IC 58 as discussed above. This provides a very simple to assemble electrical connection between PCBA 13 and the HDA and in combination with the aforementioned recess 102 and area 110 imposes no detrimental space requirements on the base/circuit board assembly.

As further shown in FIGS. 4a and 4b PCBA 13 may optionally have a PCMCIA adapter 134 at one end thereof. PCMCIA adapter 134 converts a conventional 34 pin intelligent disk drive connector to a PCMCIA connector which has 68 pins. Adapter 134 simply slips over the end of PCBA 13 and has engaging contacts 136 which mate with matching contacts 138 on PCBA 13. With the adapter 134 attached to PCBA 13 the disk drive is compatible with standard slots and connectors for receiving PCMCIA cards while with the adapter 134 removed the pins 138 on PCBA 13 couple to standard intelligent disk drive interfaces. To further facilitate ready engagement in PCMCIA slots the adapter 134 has a slide rail configuration 140 which is adapted to mate with currently conventional PCMCIA slots in laptop and palmtop computers. The plastic side portion of base 10 also preferably has an extension of rail 140 through molding 142 on the edges thereof.

Figure 5A:
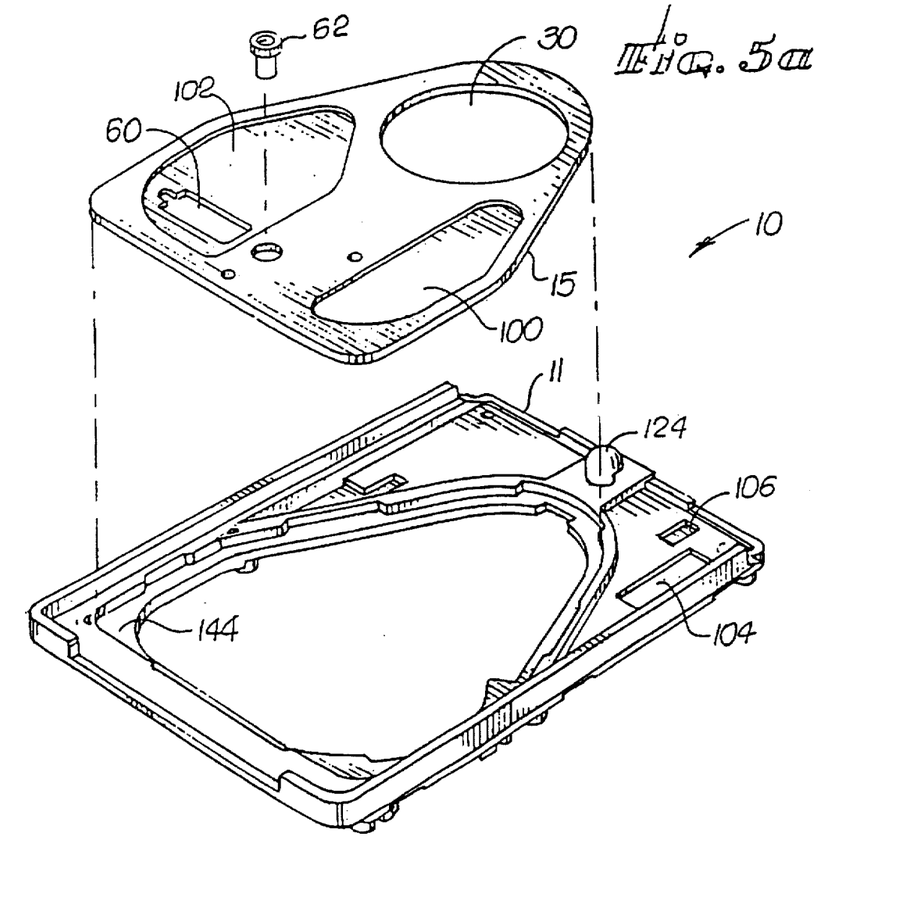
FIG. 5a is a partial exploded view of a hybrid base employed in the drive of FIG. 1.
Figure 5B:
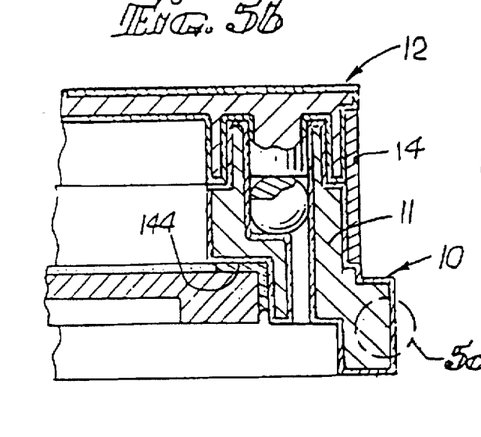
FIG. 5b is a partial cross-sectional view of the base and cover showing one of the mating portions thereof.

Referring to FIG. 5a, a two piece construction of the hybrid base 10 is illustrated. As shown, hybrid base 10 has a two piece structure employing base member 11 and base plate 15 adapted to fit within base member 11 to complete the base. Base member 11 suitably has a generally rectangular shape adapted to mate with cover 12. Base member 11 is suitably made of a lightweight but sturdy material which is readily molded using conventional manufacturing and molding techniques. For example, a plastic material is suitable for forming base member 11 as well as cover 12. Due to the readily moldable characteristics of plastic, base member 11 may be given a relatively complex shape to provide both the specific recesses for accommodating various large integrated circuits and connectors on the circuit board as discussed previously as well as providing a portion of the actuator voice coil motor assembly. Also, base/cover engagement posts 16, may be readily provided during molding of base member 11. One such snap fit engagement post is illustrated in cross-section in FIG. 5b. The readily molded plastic allows precise engagement while eliminating excess material. Other snap fit engagement structures, or other engagement means may also be employed. Further, PCMCIA rails may be formed on base member 11, as noted above, if desired for compatibility with currently conventional PCMCIA slots.

Furthermore, the overall tolerance in base member 11 as well as cover 12 may be maintained to a desired specification more readily than in prior die cast aluminum housings. and, if desired, a degree of thinness not readily achievable for such a die cast prior art housing may be provided. For example, in an embodiment employing a 1.8 inch form factor disk drive housing, a tolerance of 0.1 millimeters in the plastic base member 11 and cover 12 may readily be achieved in a high volume manufacturing facility.

Figure 5C:
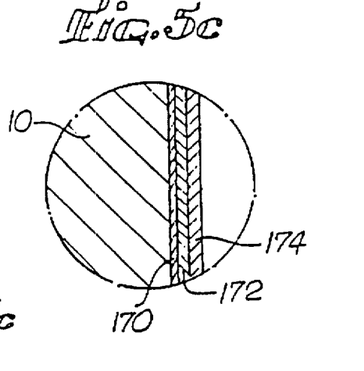
FIG. 5c is a sectional view of the housing wall showing the metal layers thereon for EMI shielding.

Referring to FIG. 5c, to provide a desired degree of electromagnetic interference (EMI) shielding to base member 11 as well as cover 12, their surfaces are preferably coated with a thin layer of shielding material. For example, a three layer coating of copper and nickel has been found suitable to provide a desired degree of EMI shielding in a overall layer thickness of less than 0.001 inches. In particular, a copper flash coating 170 may be applied to the plastic surface followed by an electroplated thicker layer of copper 172 and an electroplated layer of nickel 174 as a corrosion guard. This results in approximately 0.0007–0.0009 inches of plating, which is well bonded and provides good EMI shielding, while adding little to the overall thickness of the HDA. Thus, for example, base member 11 and cover 12 may have an overall thickness of only approximately 0.012 inches of plastic and 0.0009 inches of shielding to provide an overall thickness of 0.014 inches while providing a desired degree of EMI shielding.

As best illustrated in FIG. 5a, base member 11 preferably has a recessed support ridge 144 adapted to receive base plate 15 thereon. Since the proportions of base 10 which require more complex construction are preferably provided on base member 11, base plate 15 may be of a relatively simple construction. For example, base plate 15 may be essentially a flat plate, composed of a desired rigid material such as a steel alloy. For example, in a presently preferred embodiment, the base plate material is a 430 stainless steel alloy of 1.4 millimeters thick construction. As discussed previously, base plate 15 has a hole 30 to accommodate the spindle motor (as best illustrated in FIG. 3d). Also, base plate 15 may preferably have holes punched or cast in the steel alloy plate for receiving connector module fastening post 62.

Base plate 15 may be securely mounted on ledge 144 in base member 11 through bonding, soldering or other well known mounting techniques. For example, in the case of bonding, a first initial bond may be provided through a rapid cure adhesive which spot bonds the plate 15 to base member 11. This rapid spot bonding is followed by application of a slower curing, more secure bonding adhesive around the entire perimeter of the ledge 144. Alternatively, in the case of soldering, a solder paste could be deposited on ledge 144, e.g., via silk screen or other well known thick film technologies, followed by a reflow solder step to securely bond plate 15 in place through a heat treatment. Since, as noted above, base member 11 is preferably coated with a layer of nickel, such material may be readily soldered to base plate 15, which may also be brush plated with a nickel coating if desired. One advantage of employing a solder bonding of plate 15 onto base member 11 is that better EMI shielding may be provided at the base plate/base member junction.

We claim:

1. An intelligent disk drive comprising:

a head disk assembly defining a substantially sealed interior and having an exterior which is outside of the substantially sealed interior, the head disk assembly including:

a base having a motor mounting hole;

a spindle motor having a generally cylindrical, axially extending portion and a generally planar surface portion, with the generally cylindrical portion terminating at the generally planar surface to define a step;

the spindle motor being mounted to the base such that an axially extending portion of the generally cylindrical portion is surrounded by the hole in the base, and the generally planar surface defines a generally circular portion of the exterior of the head disk assembly;

a magnetic disk mounted to be rotated by the spindle motor;

conductive lead means having a first, second, and third strip portions, the first strip portion lying flat against the generally planar surface of the spindle motor; the second strip portion lying against the step; and the third strip portion having a plurality of exterior-facing electrical contacts, the conductive lead means provided on the exterior of the head disk assembly and;

a board assembly including:

a printed circuit board and control circuitry for the spindle motor;

the printed circuit board having a planar surface and an opening;

the control circuitry being attached to the printed circuit board; the board assembly being mounted to the head disk assembly such that the opening is aligned with the exterior-facing electrical contacts and such that the planar surface of the board faces away from the exterior-facing electrical contacts; and a plurality of spring contacts for electrically connecting the exterior-facing electrical contacts to the control circuitry; each spring contact having:

a tab portion inserted into the planar surface of the printed circuit board, and a spring portion extending from the tab portion through the opening to contact a respective one of the plurality of exterior-facing electrical contacts.

2. An intelligent disk drive according to claim 1, wherein each spring contact comprises a curved portion, and a strip extending from the curved portion and abutting the bottom surface of the printed circuit board; and wherein the tab portion projects from the strip.

3. An intelligent disk drive according to claim 1, wherein each spring contact has a scored off break point resulting from being separated from a carrier during installation.

4. An intelligent disk drive according to claim 1, wherein the conductive lead means comprises a flexible printed cable.

5. An intelligent disk drive according to claim 4, wherein the flexible printed cable has an end portion remote from the spindle motor and wherein the head disk assembly has means for retaining the end portion of the flexible printed cable.

* * * * *